US 008566150B2

(12) United States Patent
Chen et al.

(10) Patent No.: US 8,566,150 B2
(45) Date of Patent: Oct. 22, 2013

(54) ANALYZING A CONTENT-REQUESTING MEDIA ITEM

(75) Inventors: Xiaoming Chen, Cupertino, CA (US); Girish Deodhar, Cupertino, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 833 days.

(21) Appl. No.: 12/188,723

(22) Filed: Aug. 8, 2008

(65) Prior Publication Data

US 2010/0036703 A1 Feb. 11, 2010

(51) Int. Cl.
*G06Q 40/00* (2012.01)
(52) U.S. Cl.
USPC .............................................. 705/14; 705/30
(58) Field of Classification Search
USPC ....................................................... 705/10–44
See application file for complete search history.

(56) References Cited

U.S. PATENT DOCUMENTS

| | | | | |
|---|---|---|---|---|
| 5,848,396 | A * | 12/1998 | Gerace | 705/7.33 |
| 7,949,563 | B2 * | 5/2011 | Collins | 705/14.43 |
| 7,962,363 | B2 * | 6/2011 | Patel et al. | 705/14.4 |
| 8,135,626 | B2 * | 3/2012 | Das et al. | 705/26.4 |
| 8,234,159 | B2 * | 7/2012 | Heiser et al. | 705/14.1 |
| 8,239,256 | B2 * | 8/2012 | Heiser et al. | 705/14.1 |
| 2004/0243623 | A1 | 12/2004 | Ozer et al. | |
| 2007/0027754 | A1 * | 2/2007 | Collins et al. | 705/14 |
| 2007/0027768 | A1 * | 2/2007 | Collins et al. | 705/14 |
| 2007/0038508 | A1 | 2/2007 | Jain et al. | |
| 2007/0050204 | A1 * | 3/2007 | Ranka et al. | 705/1 |
| 2007/0073584 | A1 | 3/2007 | Grouf et al. | |
| 2007/0150353 | A1 * | 6/2007 | Krassner et al. | 705/14 |
| 2008/0004962 | A1 | 1/2008 | Muthukrishnan et al. | |
| 2010/0228637 | A1 * | 9/2010 | Ghosh et al. | 705/14.73 |
| 2012/0078707 | A1 * | 3/2012 | Ramakrishnan et al. | 705/14.41 |
| 2012/0123835 | A1 * | 5/2012 | Chu | 705/14.12 |

OTHER PUBLICATIONS

International Search Report and the Written Opinion of the International Searching Authority for Application No. PCT/US2009/053168, dated Mar. 30, 2010, 11 pages.
Authorized officer Simin Baharlou, International Preliminary Report on Patentability for Application No. PCT/US2009/053168, dated Feb. 8, 2011, 6 pages.

* cited by examiner

*Primary Examiner* — Frantzy Poinvil
(74) *Attorney, Agent, or Firm* — Fish & Richardson P.C.

(57) ABSTRACT

The subject matter of this specification can be implemented in, among other things, a computer-implemented method including receiving a first input from a publisher who has established an account with a content-distributing entity to publish content from others, the first input being generated based on a publisher media item configured to present at least part of the content and including code from the publisher media item for requesting the content. The method further includes obtaining the content from the content-distributing entity including using the code to generate a request for the content. The method further includes generating an analysis view available to the publisher, the analysis view generated using the content.

29 Claims, 6 Drawing Sheets

Browser Application – Ad Slot Analysis Information

File  Edit  View  Tools  Help http://adserver.com/admanager/

AdManager  [Search Orders]  user@publisher.com  ca-pub-242000

Orders  Inventory  Reports  Admin

Ad Slots  Placements  Targeting  Ad Products

Ad slot AfricaInfo_Story_Banner

AfricaInfo_Story_Banner
Ad Placement Enabled
468x60
*267*  Preview creative

Ad Slot Delivery Details
View delivery details of a specific ad slot, determining why one line item outperforms another. Modify targeting criteria (if applicable) to run additional competitions.

Targeting criteria affecting competition

Browsing environment  User specific
Country: [United States ▼]  Language: [English]
                           Topics: [business,conflict,energy]
[Rerun competition]        Countries: [nigeria,westafrica]    } *268*

Winning line item

| Order / Line Item | Start | End | Cost / Type | Type | Quantity | Delivered | Delivery | Tgt. |
|---|---|---|---|---|---|---|---|---|
| ValuClik ValuClik_Box | 7/24/07 | 1/6/09 | $6.00 cpm | Std. | 500,000 | 124,678 | 24.94% | ⊙ |

} *266*

▼ 3 rejected: Ahead of schedule

| Order / Line Item | Start | End | Cost / Type | Type | Quantity | Delivered | Delivery | Tgt. |
|---|---|---|---|---|---|---|---|---|
| Council on Africa CCA 2008 - JPG | 7/18/08 | 10/7/08 | $10.00 cpm | Std. | 1,250,000 | 150,362 | 98.16% | ⊙ |
| UBA Group UBA Banner Ad | 7/1/08 | 7/31/08 | $10.00 cpm | Std. | 200,000 | 181,209 | 102.26% | |
| Humane Dev. Prog. Hum. Dev. Prog. Ad | 5/12/08 | 9/18/08 | $8.00 cpm | Std. | 1,000,000 | 616,141 | 103.33% | ⊙ |

} *264a*

▼ 1 rejected: Priority ranked lower

| Order / Line Item | Start | End | Cost / Type | Type | Quantity | Delivered | Delivery | Tgt. |
|---|---|---|---|---|---|---|---|---|
| Pub-o-Matic Pub-o-Matic Banner | 7/3/08 | 1/1/09 | $0.20 cpm | Rem. | Unlimited | 1,202,106 | N/A | |

} *264b*

1 rejected: Ad placement service offered better return } *264c*

▶
View more related line items

*262*

Done

FIG. 2C

ANALYZING A CONTENT-REQUESTING MEDIA ITEM

TECHNICAL FIELD

This specification relates to information processing.

BACKGROUND

Advertisers conventionally purchase advertising inventory (e.g., advertisement spots) from advertising publishers (e.g., television stations, radio stations, and other providers of information over different types of media) according to procedures that support pre-defined advertisement targeting. For example, advertisers may have a well defined target market that they are attempting to reach with their advertising message. Similarly, advertisers can perform very detailed analysis on the return that they can expect from a properly targeted advertisement. Advertisers can select advertising inventory in an effort to satisfy their targeting and revenue projection efforts.

Advertising publishers/owners of advertising inventory can place restrictions on their advertising inventory in an attempt to efficiently allocate the advertising to advertisers. For example, owners of advertising inventory can restrict the types of advertisements that can appear near other advertisements. Similarly, owners of advertising inventory can restrict the number of advertisements that are placed by a single advertiser.

Advertising inventory can be allocated to a limited number of advertisers during any given time period. Allocation can be performed, for example, in an attempt to balance the constraints imposed by advertisers and the restrictions placed on the advertising inventory by the owners of the inventory. However, inefficient allocation of the advertising inventory can affect the value of the advertising inventory to advertisers and, in turn, revenue received by the owners of the advertising inventory.

SUMMARY

In general, this document describes analyzing a content-requesting media item. In a first aspect, a computer-implemented method includes receiving a first input from a publisher who has established an account with a content-distributing entity to publish content from others, the first input being generated based on a publisher media item configured to present at least part of the content and including code from the publisher media item for requesting the content. The method further includes obtaining the content from the content-distributing entity, including using the code to generate a request for the content. The method further includes generating an analysis view available to the publisher, the analysis view generated using the content.

Implementations can include any, all, or none of the following features. The analysis view can include information from the content-distributing entity regarding the request. The content can include at least one winning advertisement resulting from an advertisement placement selection process for placement on the publisher media item. The method can include receiving a second input from the publisher changing a parameter that results in at least one new winning advertisement from the advertisement placement selection process for the publisher media item. Generating the analysis page can include providing information to the publisher regarding the one or more winning advertisements and one or more non-winning advertisements from the advertisement placement selection process. Providing the information to the publisher can include presenting at least one of a reason why the one or more winning advertisements won the advertisement placement selection process or a reason why the one or more non-winning advertisements lost the advertisement placement selection process. The code from the publisher media item for requesting the content can include an identifier of the publisher, and using the code to generate the request for the content can include submitting the identifier of the publisher to the content-distributing entity. The code from the publisher media item for requesting the content can include an identifier of a content location within the publisher media item for presenting the at least part of the content, and using the code to generate the request for the content can include submitting the identifier of the content location to the content-distributing entity. The method can include providing a menu of one or more input controls to the publisher, at least one of the input controls configured to generate the first input from the publisher. The method can include receiving a request for the menu from the publisher including an address of the publisher media item and a parameter indicating the request for the menu. Providing the menu can include identifying within the code from the publisher media item for requesting the content one or more identifiers of content locations. Providing the menu can include altering the publisher media item to can include a link to the analysis view. Providing the menu can include providing a menu view separate from the publisher media item, the menu view can include a link to the analysis view.

In a second aspect, a computer program product tangibly embodied in a computer-readable storage medium, the computer program product including instructions that, when executed, generate on a display device a graphical user interface including an input control configured to generate a first input from a publisher who has established an account with a content-distributing entity to publish content from others, the first input being generated based on a publisher media item configured to present at least part of the content and includes code from the publisher media item for requesting the content. The computer program product further includes an analysis area generated using the code and includes information from the content-distributing entity regarding the request.

In a third aspect, a computer program product tangibly embodied in a computer-readable storage medium, the computer program product including instructions that, when executed, generate on a display device a frontend tool including a scheduling component where a publisher who has established an account with a content-distributing entity can schedule delivery of content from others for publication. A publisher media item is configured to present at least part of the content and includes code for requesting the content. The computer program product further includes a content analysis component using the code to request the content from the content-distributing entity and present an analysis area to the publisher, the analysis view generated using the content and the request.

The systems and techniques described here may provide one or more of the following advantages. First, a system can provide navigation from a publisher media item to an analysis of content presented with the publisher media item. Second, a system can provide for real-time analysis of content selection for presentation with a publisher media item. Third, a system can present a reason why particular content was or was not selected for presentation with a publisher media item. Fourth, a system can simulate runtime targeting parameters for selection of content to be presented with a publisher media item.

The details of one or more embodiments of the content-requesting media item analysis feature are set forth in the accompanying drawings and the description below. Other features and advantages of the content-requesting media item analysis feature will be apparent from the description and drawings, and from the claims.

DESCRIPTION OF DRAWINGS

FIG. 2A-C are examples of user interfaces for analyzing an advertisement-requesting web page.

Like reference symbols in the various drawings indicate like elements.

DETAILED DESCRIPTION

This document describes examples of systems and techniques for analyzing a content-requesting media item. In some of these examples, a content-distributing entity receives content such as advertisements (ads) from a content provider such as an advertiser. The content-distributing entity provides the content to a publisher. The publisher presents or publishes the received content in association with a media item, such as text, video, audio, an image, or combinations of these. The publisher can request from the content-distributing entity an analysis of some aspect of the content publication and/or the media item, such as why the content-distributing entity provides a particular content for presentation with the media item and/or why other content is not provided for presentation with the media item. While the following examples describe an Internet advertisement distributing system, other systems can be used, such as a system that provides search results to publishers for presentation with a media item.

Figure 1:
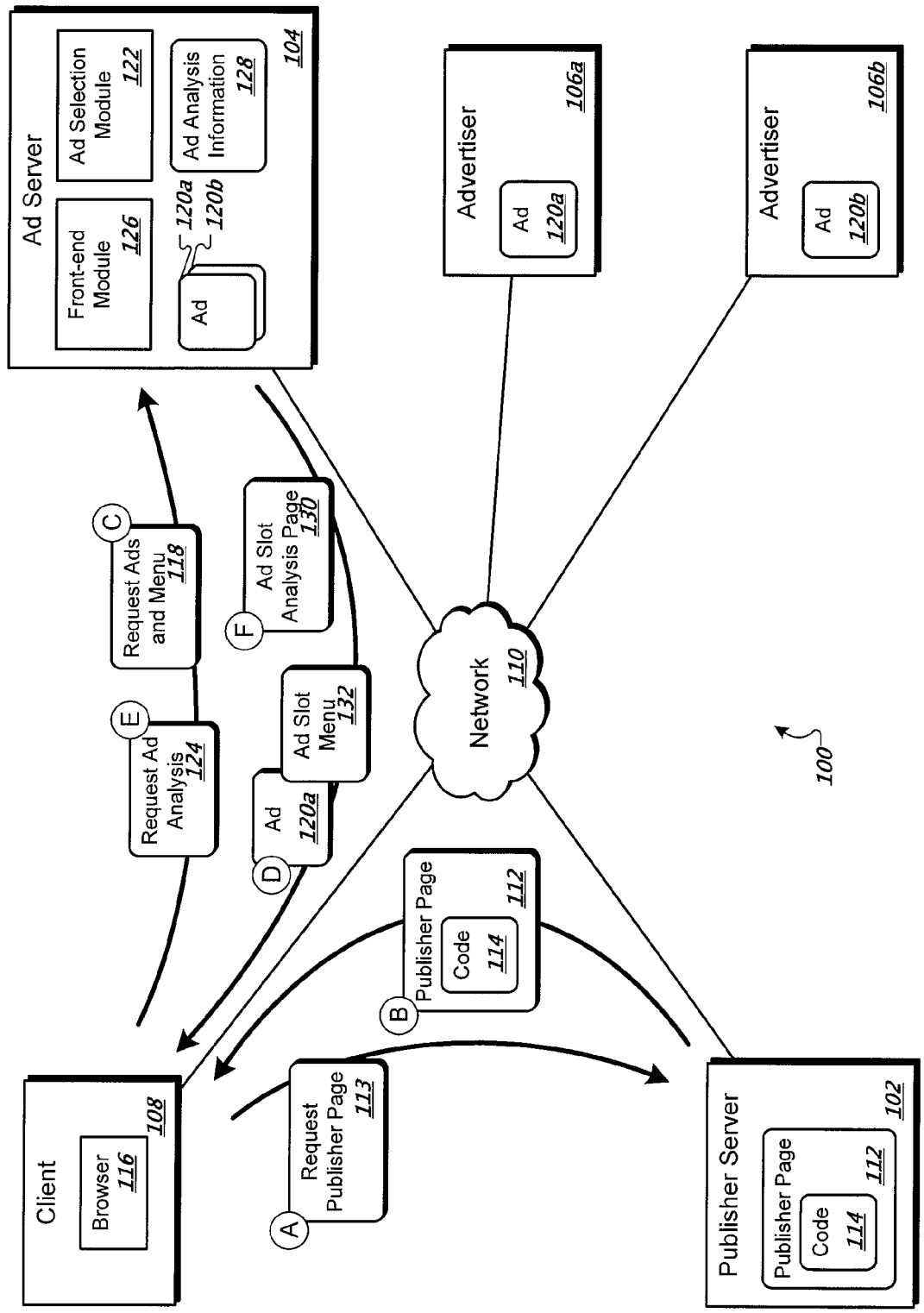
FIG. 1 is block diagram showing an example of a system for analyzing an advertisement-requesting web page.

FIG. 1 is block diagram showing an example of a system 100 for analyzing content such as a web page configured for requesting other content such as an advertisement. The system 100 includes a publisher server 102, an ad server 104, multiple advertisers 106a-b, and a client 108 in communication through a network 110. The network 110 can include one or more networks, such as wired or wireless networks, wide area networks, and the Internet.

The publisher server 102 provides a media item, such as a publisher page 112, to clients on the network 110. For example, the client 108 can send a request 113 for the publisher page 112 to the publisher server 102 (step A in FIG. 1). In response, the publisher server 102 provides the publisher page 112 to the client 108 (step B in FIG. 1). In some implementations, the publisher page 112 is a web page. The publisher page 112 can be written in a language such as Hyper-Text Markup Language (HTML) or another web presentation language.

The publisher page 112 includes code 114. The code 114 identifies slots in the publisher page 112 in which advertisements can be placed. In some implementations, the code 114 can be written in a language such as JavaScript or another client-side web scripting language. The client 108 includes a browser 116 for processing the publisher page 112 and presenting the publisher page 112 to a user. The browser 116 receives the publisher page 112 and executes the code 114. In some implementations, executing the code 114 results in a request for additional code from a server, such as the ad server 104. For example, the code 114 can include a link to an external JavaScript file on the ad server 104. The code 114 (and/or the additional code) sends a request 118 to the ad server 104 for one or more advertisements to be presented with the publisher page 112 (step C in FIG. 1).

The ad server 104 includes multiple ads 120a-b from the advertisers 106a-b, respectively. The advertisers 106a-b have an account or contract with the ad server 104 to distribute the ads 120a-b to publishers. In some implementations, the advertisers 106a-b provide the ads 120a-b to the ad server 104 over the network 110. The publisher server 102 has an account or contract with the ad server 104 to provide one or more ad slots in which ads such as the ads 120a-b can be placed. The ads 120a-b can be targeted to particular publishers and to particular clients. For example, a country and a language of the client 108 can be determined using an Internet Protocol (IP) address lookup, using a JavaScript command on the client, or by examining the header fields in the HTML request for ads. In addition, the publisher server 102, a network domain associated with the publisher page 112, and/or the publisher page 112 can be associated with keywords, a country, and/or a language for targeting ads. Further, the advertisers 106a-b can submit bids to the ad server 104 for placement of ads in the publisher page 112.

The ad server 104 includes an ad selection module 122. The ad selection module 122 determines which of the ads 120a-b are sent to the client 108 for presentation with the publisher page 112. For example, the ad selection module 122 can compare targeting information from the client 108 and the publisher page 112 to the ads 120a-b. If the ad selection module 122 finds a match, then the ad selection module 122 schedules the matching ad for delivery to the requesting publisher page. In addition, the ad selection module 122 can compare the bids submitted by the advertisers 106a-b as well as other information, such as the advertiser's remaining budget or the frequency with which an advertiser's ads are placed. The ad selection module 122 determines one or more winners of an ad placement selection process.

In some implementations, the ad placement selection process can include criteria targeting and/or an ad slot auction. For example, the ad 120a may be targeted to the country "Nigeria" and the language "English." The publisher page 112 and/or the client 108 may have a country property of "Nigeria" and a language of "English" matching the properties of the ad 120a. In addition, the ad 120a may have an associated bid that is higher than the ad 120b. The ad selection module 122 provides the ad 120a which won the ad placement selection process to the client 108 (step D in FIG. 1).

In some implementations, the ad selection module 122 can use a process other than an auction or competition to select ads to be sent to the client 108. For example, the ad selection module 122 can accept reservations for ad placement. For example, the ad selection module 122 can receive reservations from the advertisers 106a-b on a first-come-first-served basis for ad placements in the publisher page 112. In another example, the ad reservation module can apply a fixed priority to the advertisers 106a-b. That is, the advertiser 106a may have a first-right-of-refusal for ad placements in the publisher page 112 over the advertiser 106b.

A user can send a request 124 (step E in FIG. 1) to the ad server 104 for an analysis of ads that won or lost an ad selection process for a particular ad slot in the publisher page 112. For example, such an analysis can be useful to, and be generated specifically for, the publisher who controls the publisher page 112. In particular, the ad server 104 here includes a front-end module 126 for generating an analysis of an ad slot in the publisher page 112. The ad server 104 stores information such as budgets, bids, limits, and/or targeting properties as ad slot information 128. The front-end module 126 uses the ad slot information 128 to generate an ad slot analysis page 130. For example, the front-end module 126 can use advertiser bids in the ad slot information 128 to determine that a particular ad lost an ad placement selection process due to another ad having the highest bid. In another example, the front-end module 126 can use an advertiser budget in the ad slot information 128 to determine that a particular ad lost an ad selection process due to the remaining budget being less than the cost of the placement in the ad slot. In another example, the front-end module 126 can use an advertiser frequency cap in the ad slot information 128 to determine that a particular ad lost an ad placement selection process due to the ad having been placed in the ad slot a threshold number of times during a particular time interval. The front-end module 126 provides the ad slot analysis page 130 to the browser 116 (step F in FIG. 1).

In some implementations, the user sends the request 124 for ad slot analysis by selecting an item in an ad slot menu 132 for the publisher page 112. In one example, the ad server 104 provides the ad slot menu 132 or a portion of the ad slot menu 132 to the client 108. In another example, the code 114 determines the ad slots included in the publisher page 112 and presents the ad slot menu 132 to the user of the client 108. The code 114 can determine the ad slots using JavaScript to traverse the nodes of the HTML in the publisher page 112. In traversing the nodes, the code 114 can locate identifiers of ad slots included in the publisher page 112.

Figure 2A:
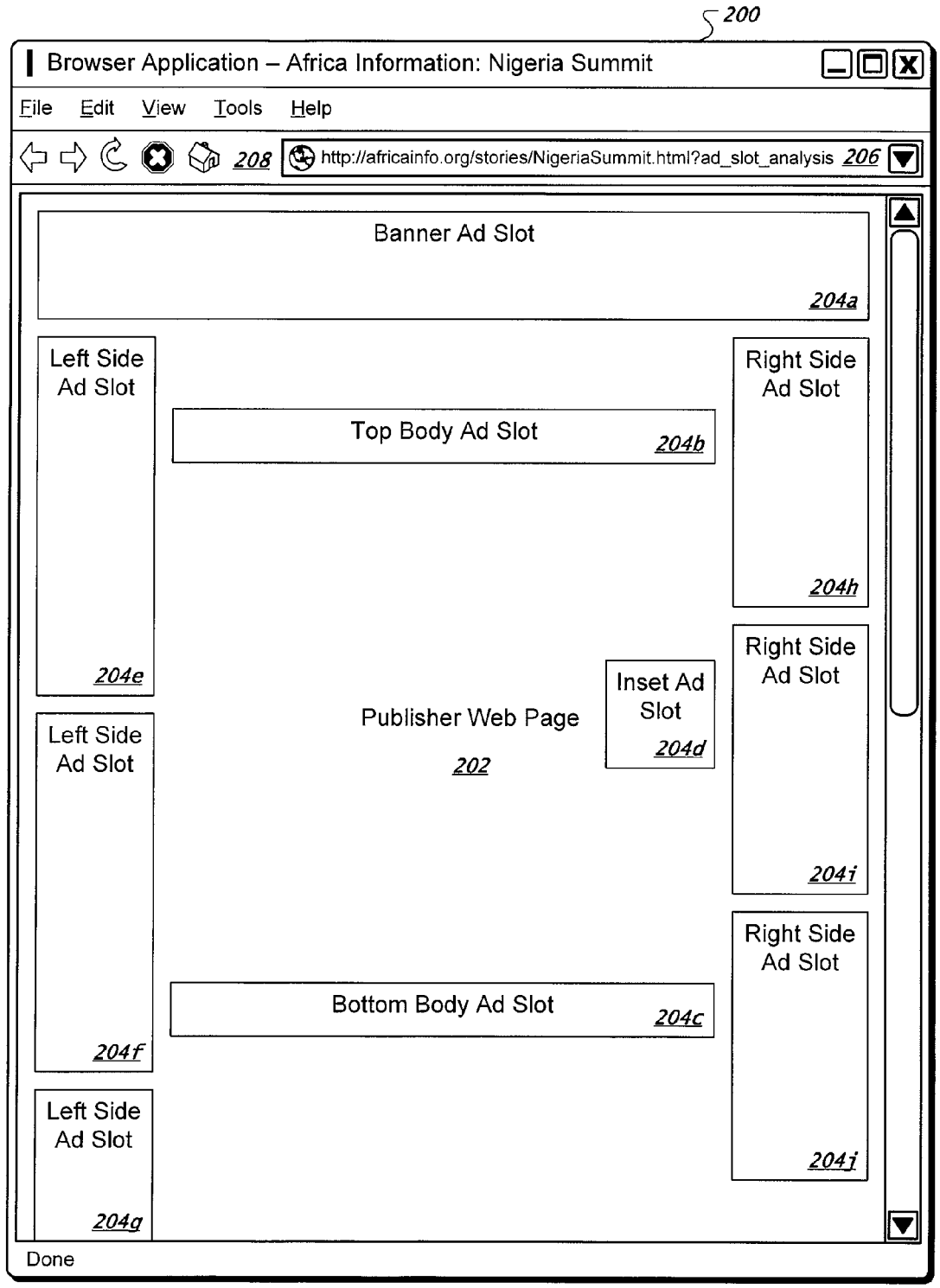

FIG. 2A is an example of a graphical user interface (GUI) 200 that includes a publisher page 202. In some implementations, the GUI 200 can be generated by the browser 116 and the publisher page 202 can be provided by the publisher server 102 (FIG. 1). The publisher page 202 is an Internet web page for an "AfricaInfo" publisher. The publisher page 202 includes multiple ad slots 204a-j. Each of the ad slots 204a-j participate in an ad placement selection process at an ad server, such as the ad server 104. A user, such as an employee of the company that owns the publisher server 102, may be interested in analyzing ads placed in the ad slots 204a-j by the ad selection module 122.

In one example, the user can request an ad slot menu by adding a parameter to a web address 206 or Uniform Resource Locator (URL) of the publisher page 202, such as the parameter "ad_slot_analysis." In another example, the user can select a button in a toolbar 208 of the GUI 200 to request the ad slot menu. The button can be provided, for example, by a plug-in application to the browser 116. In some implementations, the toolbar plug-in parses the publisher page 202 for ad slot identifiers and inserts an additional button into the toolbar 208 for each of the ad slots. The user can select one of the additional buttons to request an ad slot analysis for the corresponding ad slot. In some implementations, the toolbar plug-in can add or change portions of the publisher page 202 to highlight the ad slots 204a-j and to provide a menu of ad slots. For example, a plug-in application can add a bold border or color to each of the ad slots 204a-j. The toolbar plug-in application can modify links on ads in the ad slots to direct a user, such as a user associated with the publisher, to an ad slot analysis page. Alternatively, the toolbar plug-in application can add or overlay objects on the publisher page 202 on top of or near each of the ad slots 204a-j. The menu of added overlay objects can include links to ad slot analysis pages for the corresponding ad slots.

Figure 2B:
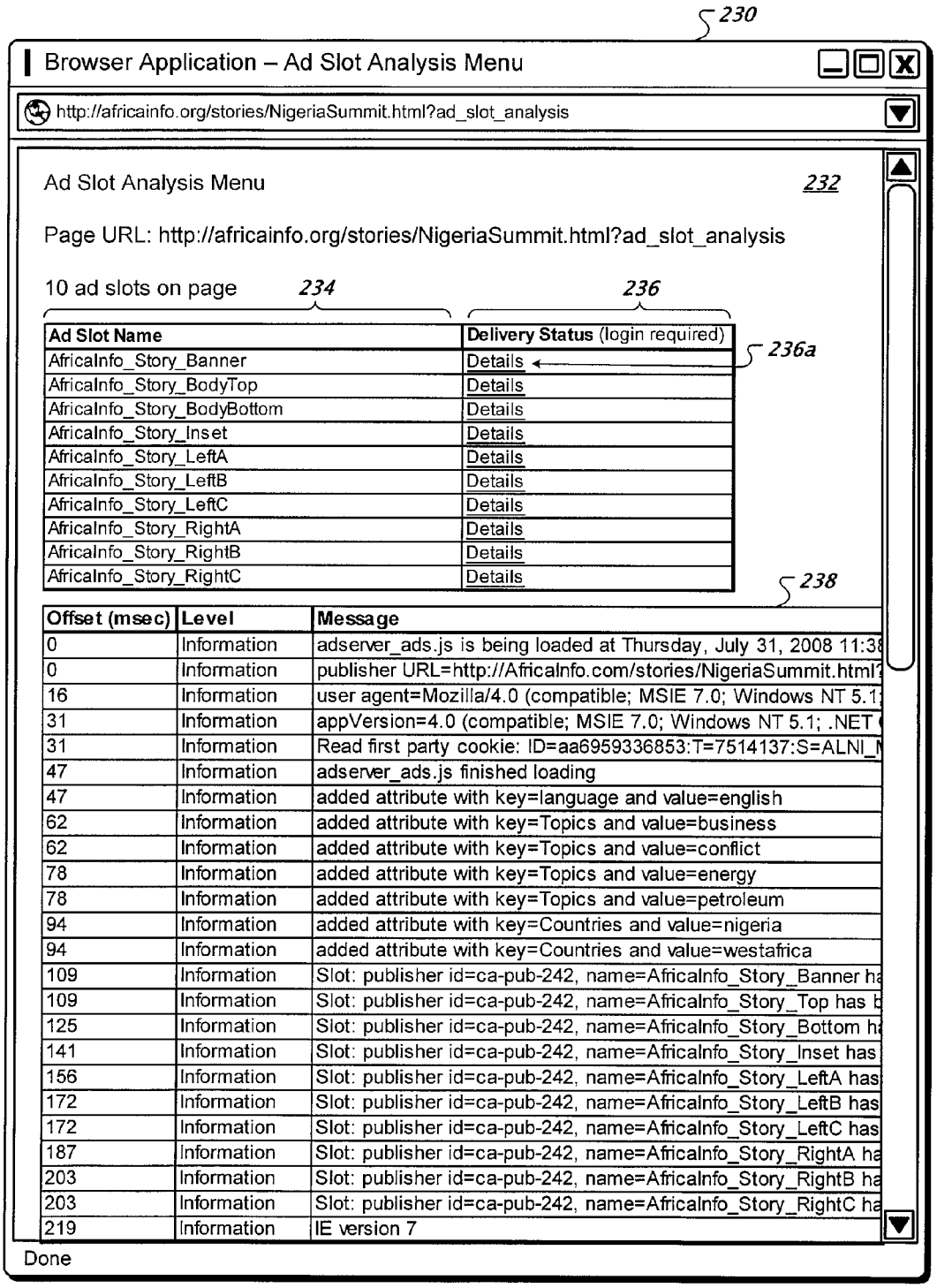

FIG. 2B is an example of a graphical user interface (GUI) 230 that includes an ad slot menu 232 for requesting an ad slot analysis page. In some implementations, the GUI 230 can be generated by the browser 116 and the ad slot menu 232 can be provided by the code 114 and/or the front-end module 126 (FIG. 1). The ad slot menu 232 includes multiple ad slot identifiers 234 (or names) and multiple links 236 for requesting an ad slot analysis page for each of the ad slots 204a-j. For example, the user can select a link 236a to request an ad slot analysis page for the ad slot 204a. The browser 116 sends the request to the ad server 104. In some implementations, selecting the link 236a results in the ad selection module 122 performing a real-time determination of ads that win and ads that do not win the ad placement selection process for the ad slot associated with the link 236a. In some implementations, the processing performed by the ad selection module 122 in response to a request for an ad slot analysis page is substantially the same as a typical runtime request to the ad server 104 to place an ad in an ad slot. In some implementations, the link 236a for requesting the ad slot analysis page includes substantially the same URL as the code 114 for requesting an ad placement. The link 236a can include an additional parameter identifying the request as an ad slot analysis request.

In some implementations, the ad slot menu 232 is generated locally at the client 108, such as by the code 114. For example, the code 114 can detect the "ad_slot_analysis" URL parameter and in response parse the publisher page 202 and present the ad slot menu 232 to the user. In some implementations, the ad server 104 provides the ad slot menu 232 or a portion of the ad slot menu 232 to the client 108. For example, the code 114 can detect the "ad_slot_analysis" URL parameter and, in response, send a request to the ad server 104 for ad slot menu information, such as one or more ad debug messages 238.

FIG. 2C is an example of a graphical user interface (GUI) 260 that includes an ad slot analysis page 262. In some implementations, the GUI 260 can be generated by the browser 116 and the ad slot analysis page 262 can be provided by the front-end module 126 (FIG. 1). The ad slot analysis page 262 includes one or more lists 264a-c of rejected ads (e.g., ads that did not win the ad placement selection process for that particular ad placement) as well as an indication 266 of an ad that won the ad placement selection process. The ad slot analysis page 262 also includes an ad slot properties area 267. The ad slot properties area 267 includes the type of the ad slot and other properties such as an identifier and a size. The lists 264a-c of rejected ads as well as the indication 266 of the winning ad present start and end dates for each advertisers ad campaign, a cost (e.g., cost per million impressions), a type of ad, a requested quantity of impressions, a number of impressions delivered, a percentage of impression delivered, and an indication of whether or not targeting criteria exist. A user can hover a pointing device cursor over a targeting criteria indicator (the target symbol) to open a pop-up window with the corresponding ad targeting criteria. The lists 264a-c of rejected ads and the indication 266 also include a link to the actual creative for the ad (e.g., "ValuClik_Box").

The lists 264a-c are grouped by the reason for the rejection. For example, the list 264a includes ads that were rejected as being ahead of schedule. That is, for this point in time in the span of the campaign (e.g., 50% through the campaign) the ads have all been delivered more than 50% of the requested number of impressions. The list 264b was rejected as having a priority that is lower than the winning ad or ads. For example, ads can have different types such as "Standard," "Public Service Announcement," or "Remaining" and each ad type can have an associated priority that is lower or higher than the other ad types. Other reasons for rejection can include, for example, an ad is not active, an error occurred in processing the ad, a delivery goal (e.g., quantity) of the ad has been reached, a limit to the frequency of impressions for the ad was reached, current time outside of dayparting window for the ad (e.g., different ads are presented at different times of the day), a limit by a number of ads per page, a filter applied by the publisher (e.g., a filter that prevents a competitor's ads from being presented or a filter that prevents objectionable or unrelated ads from being presented), or an indication that another type of ad placement selection process provided a better return (e.g., automatic ad placement based on keywords versus advertiser selected ad placement).

The user can select the header line for each of the lists 264a-c to expand of contract the selected list. The header of each list also includes an indication of how many ads were rejected in the grouping. The user can select a "view more related line items" to see additional groups of ads that were rejected during the ad placement selection process.

The ad slot analysis page 262 includes multiple input controls 268 for modifying the browsing environment parameters (e.g., basic criteria) of the user and user specific parameters (e.g., custom criteria). For example, if the user is located in the United States, but the user wants to see an ad slot analysis for users having a country location of Nigeria or West Africa, then the user can input the country locations and request a rerun of the ad placement selection process. The front-end module 126 and the ad selection module 122 will perform the ad placement selection process again as if the user had custom criteria of Nigeria and West Africa. Correspondingly, if there are ads in the ad server 104 that target Nigeria or West Africa, then a newly generated ad slot analysis page may include an updated real-time analysis of ad placements in the selected ad slot that includes different ads than the previous analysis that did not target Nigeria and West Africa. In addition to country parameters, the user can modify other ad targeting parameters, such as the language of the user or the client 108 and keywords associated with the user.

Figure 3:
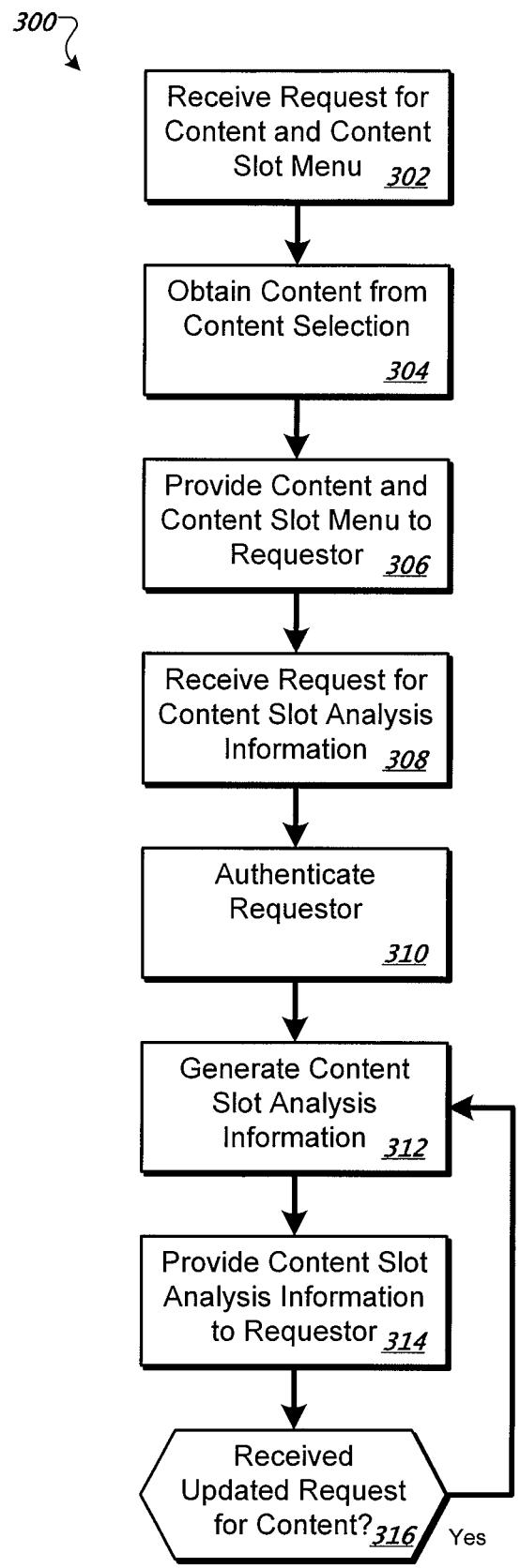
FIG. 3 is a flow chart showing an example of a process for analyzing a content-requesting media item.

FIG. 3 is a flow chart showing an example of a process 300 for analyzing a content-requesting media item. The process 300 may be performed by a processor executing instructions in a computer-readable storage medium, for example by a system such as the system 100 and/or in user interfaces such as the user interfaces 200, 230, and 260. For clarity of presentation, the description that follows uses the system 100 and the user interfaces 200, 230, and 260 as the basis of examples for describing the process 300. However, another system, user interface, or combination of systems and user interfaces, may be used to perform the process 300. In addition, the logic flows depicted in the process 300 do not require the particular order shown, or sequential order, to achieve desirable results. One or more other steps may be provided, or eliminated, from the process 300, and other components may be added to, or removed from, the described systems.

The process 300 begins with receiving (302) a request for one or more content placements in one or more corresponding content slots in a publisher media item. For example, the ad server 104 receives the request 118 from the client 108 for ad placements in the publisher page 112. In some implementations, the process 300 also receives a request for a content slot analysis menu. For example, the code 114 in the publisher page 112 can generate a request for an ad slot menu.

The process 300 obtains (304) content from a content placement selection process using code included in the publisher media item. For example, the ad selection module 122 uses the publisher and ad slot identifiers from the code 114 in the publisher page 112 to determine that the ad 120a is a winner of the ad placement selection process and obtains the ad 120a.

The process 300 provides (306) the obtained content to the requester. For example, the ad server 104 provides the ad 120a to the browser 116 at the client 108. In some implementations, the process 300 provides the content slot menu to the requester. For example, the ad server 104 can provide the ad slot menu 232 to the client 108. Alternatively, the code 114 executed in the browser 116 at the client 108 can parse the publisher page 112 to locate the ad slot identifiers and generate the ad slot menu 232.

The process 300 receives (308) a request for a content slot analysis. For example, the client 108 sends the request 124 for an ad slot analysis page to the front-end module 126.

The process 300 authenticates (310) the requester. For example, the front-end module 126 can provide a login page to the browser 116 and in response, receive a user name and password for authenticating the user who made the request for the ad slot analysis. Alternatively, credentials may be retrieved from a storage, such as a browser cookie, and provided to the front-end module 126 without user intervention.

The process 300 generates (312) the content slot analysis information. For example, the front-end module 126 can use the ad slot information 128 to generate the ad slot analysis page 262.

The process 300 provides (314) the content slot analysis information to the requester. For example, the front-end module 126 provides the ad slot analysis page 262 to the client 108 over the network 110.

If the process 300 receives (316) an updated request for content analysis, then the process 300 generates content slot analysis information again. For example, the user can make an input in the ad slot analysis page 262 to change a browsing environment criterion or a user specific criterion. The new criteria can result in a different set of ads from the ad selection module 122 due, for example, to ad targeting. In response to new ad placement selection process results, the front-end module 126 generates and provides an updated ad slot analysis for the publisher page 202 and the selected ad slot.

Figure 4:
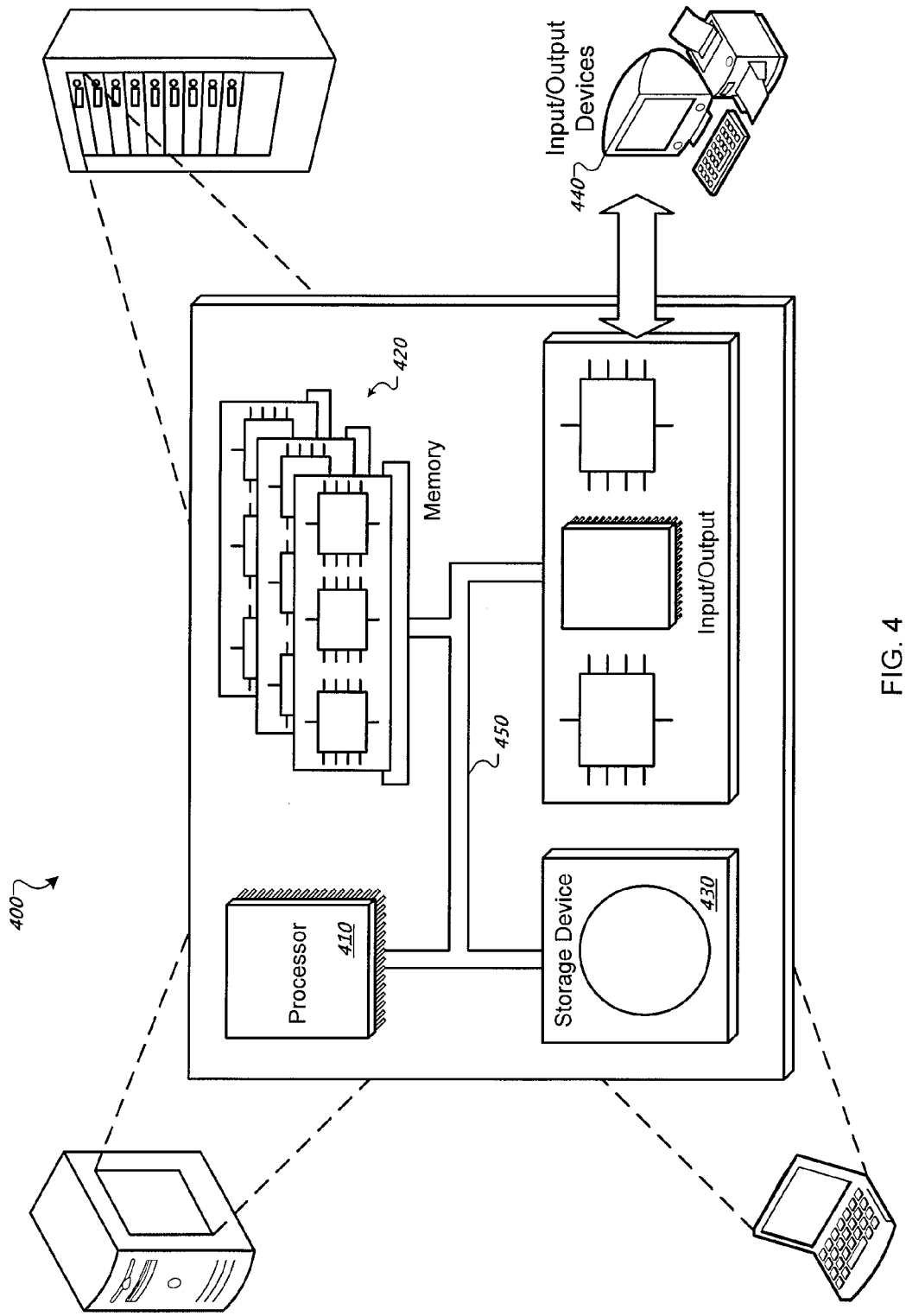
FIG. 4 is a schematic diagram showing an example of a generic computing system that can be used in connection with computer-implemented methods described in this document.

FIG. 4 is a schematic diagram of a generic computing system 400. The generic computing system 400 can be used for the operations described in association with any of the computer-implement methods described previously, according to one implementation. The generic computing system 400 includes a processor 410, a memory 420, a storage device 430, and an input/output device 440. Each of the processor 410, the memory 420, the storage device 430, and the input/output device 440 are interconnected using a system bus 450. The processor 410 is capable of processing instructions for execution within the generic computing system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the generic computing system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the generic computing system 400. In one implementation, the storage device 430 is a computer-readable medium. In various different implementations, the storage device 430 may be a floppy disk device, a hard disk device, an optical disk device, or a tape device.

The input/output device 440 provides input/output operations for the generic computing system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by a server, a request for one or more advertisements to be presented in an ad slot of a publisher page, the publisher page comprising publisher content located separate from the ad slot;
identifying, by the server and from the one or more advertisements, one or more winning advertisements that an ad placement selection process selects for placement in the ad slot, and one or more losing advertisements that the ad placement selection process does not select for placement in the ad slot;
receiving at the server a request for an ad analysis of the winning advertisements and the losing advertisements; and
in response to the request, generating, by the server, the ad analysis,
wherein the ad analysis identifies at least one reason for the winning advertisements winning the ad placement selection process, and at least one reason for each of the losing advertisements losing the ad placement selection process, and
wherein the losing advertisements are grouped based on the respective reason for which the advertisement lost the ad placement selection process.

2. The method of claim 1, wherein the request is received from a computing system of the publisher.

3. The method of claim 1, further comprising receiving, at the server, an input that results in at least one new winning advertisement being selected from the ad selection process for the ad slot of the publisher page.

4. The method of claim 1, further comprising receiving, at the server, an identifier of the publisher.

5. The method of claim 1, further comprising receiving, at the server, an identifier of a geographic location associated with the publisher content.

6. The method of claim 1, further comprising providing a menu of one or more input controls to a computing system of the publisher, at least one of the input controls configured to generate the request for the ad analysis from the computing system of the publisher.

7. The method of claim 6, wherein providing the menu comprises requesting the one or more advertisements based on one or more identifiers of a geographic location associated with the publisher content.

8. The method of claim 7, wherein providing the menu further comprises altering the publisher page to include a link to the ad analysis.

9. The method of claim 7, wherein providing the menu further comprises providing a menu view separate from the publisher content, the menu view including a link to the ad analysis.

10. A computer program product tangibly embodied in a computer-readable storage medium, the computer program product including instructions that, when executed, generate on a display device a frontend tool comprising:
  a scheduling component configured to deliver, according to an ad selection process, ad content for publication on a publisher page, wherein the ad content comprising winning advertisements selected from the ad selection process, and the publisher page configured to present at least part of the ad content in association with publisher content located separate from the ad content; and
  a content analysis component configured to
    receive a request for an analysis of the ad content as published on the publisher page; and
    present an analysis view to the publisher, the analysis view generated using the ad content and the request,
    wherein the analysis view identifies at least one reason for the ad selection process to choose the winning advertisement and to reject the non-winning advertisements, and
    wherein the analysis view further groups the non-winning advertisements according to the respective reason for which the advertisement was rejected by the ad placement selection process.

11. A computer system comprising:
  one or more processors;
  a storage device coupled to the one or more processors and storing instructions that, when executed by one or more of the one or more processors, cause the one or more processors to perform operations comprising:
  receiving a request for one or more advertisements to be presented in an ad slot of a publisher page, the publisher page comprising contents located separate from the ad slot;
  identifying, through an ad placement selection process, one or more winning advertisements and one or more losing advertisements from said one or more advertisements, wherein only the one or more winning advertisements are to be placed in the ad slot;
  receiving a request for an ad analysis of the winning advertisements and the losing advertisements;
  in response to the request, generating the ad analysis,
    wherein the ad analysis identifies at least one reason for the winning advertisements winning the ad placement selection process, and at least one reason for each of the losing advertisements losing the ad selection process, and
    wherein the ad analysis further groups the losing advertisements according to the respective reason the advertisement lost the ad selection process; and
  transmitting the ad analysis to a user.

12. The system of claim 11, the operations further comprising receiving an input that results in at least one new winning advertisement from the ad selection process for the ad slot of the publisher page.

13. The system of claim 11, the operations further comprising receiving, at the server, an identifier of the publisher.

14. The system of claim 11, the operations further comprising receiving, at the server, an identifier of a geographic location associated with the publisher content.

15. The system of claim 11, the operations further comprising providing a menu of one or more input controls to the user, at least one of the input controls configured to generate the request for an ad analysis from the user.

16. The system of claim 15, wherein providing the menu comprises requesting the one or more advertisements based on one or more identifiers of a geographic location associated with the publisher content.

17. The system of claim 16, wherein providing the menu further comprises altering the publisher page to include a link to the ad analysis.

18. The system of claim 16, wherein providing the menu further comprises providing a menu view separate from the publisher content, the menu view including a link to the ad analysis.

19. The system of claim 11, wherein the user corresponds to a computing system of the publisher.

20. A non-transitory computer-readable medium storing software comprising instructions executable by one or more computers which, upon such execution, cause the one or more computers to perform operations comprising:
  receiving a request for one or more advertisements to be presented in an ad slot of a publisher page, the publisher page comprising publisher content located separate from the ad slot;
  identifying through an ad placement selection process, one or more winning advertisements and one or more losing advertisements from said one or more advertisements, wherein only the one or more winning advertisements are to be placed in the ad slot;
  receiving a request for an ad analysis of the winning advertisements and the losing advertisements ad analysis; and
  in response to the request, generating the ad analysis,
    wherein the ad analysis identifies at least one reason for the winning advertisements winning the ad placement selection process, and reasons for the losing advertisements losing the ad placement selection process, and
    wherein the losing advertisements are grouped by the reason for which the advertisement lost the ad placement selection process.

21. The non-transitory computer-readable medium of claim 20, wherein the request is received from a computing system of the publisher.

22. The non-transitory computer-readable medium of claim 20, wherein the operations further comprising receiving, at the server, an input that results in at least one new winning ad advertisement being selected from the ad selection process for the ad slot of the publisher page.

23. The non-transitory computer-readable medium of claim 20, wherein the operations further comprising receiving, at the server, an identifier of the publisher.

24. The non-transitory computer-readable medium of claim 20, wherein the operations further comprising receiving, at the server, an identifier of a geographic location associated with the publisher content.

25. The non-transitory computer-readable medium of claim 20, wherein the operations further comprising:
  providing a menu of one or more input controls to a computing system of the publisher, at least one of the input controls configured to generate the request for the ad analysis.

26. The non-transitory computer-readable medium of claim 25, wherein providing the menu comprises identifying a geographic location associated with the publisher content.

27. The non-transitory computer-readable medium of claim 25, wherein providing the menu further comprises altering the publisher page to include a link to the ad analysis.

28. The non-transitory computer-readable medium of claim 25, wherein providing the menu further comprises providing a menu view separate from the publisher content, the menu view including a link to the ad analysis.

29. A computer-implemented method, comprising:
sending, by a computer system, a request for one or more advertisements to be presented in an ad slot of a publisher page, the publisher page comprising publisher content located separate from the ad slot;
receiving, at the computer system, one or more winning advertisements selected from the one or more advertisements, wherein the one of more winning advertisements are to be placed in the ad slot;
sending, from the computing system, a request for an ad analysis of ad content published in the ad slot on a publisher page, and
receiving, at the computing system, the ad analysis,
wherein the ad analysis identifies at least one reason for the winning advertisements winning the ad placement selection process, and at least one reason for each of the non-winning advertisements losing the ad placement selection process, and
wherein the non-winning advertisements are grouped by the reason for which the advertisement lost the ad placement selection process.

* * * * *

UNITED STATES PATENT AND TRADEMARK OFFICE
CERTIFICATE OF CORRECTION

| | | |
|---|---|---|
| PATENT NO. | : 8,566,150 B2 | |
| APPLICATION NO. | : 12/188723 | |
| DATED | : October 22, 2013 | |
| INVENTOR(S) | : Xiaoming Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this
Seventh Day of April, 2015

Michelle K. Lee
*Director of the United States Patent and Trademark Office*